(12) United States Patent
Little (10) Patent No.: US 11,346,240 B2
(45) Date of Patent: May 31, 2022

(54) GAS TURBINE ENGINE BLEED VALVE DAMPING GUIDE LINK

(71) Applicant: United Technologies Corporation, Farmington, CT (US)

(72) Inventor: Jonathan D. Little, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 271 days.

(21) Appl. No.: 16/434,722

(22) Filed: Jun. 7, 2019

(65) Prior Publication Data
US 2020/0386115 A1  Dec. 10, 2020

(51) Int. Cl.
*F01D 17/14* (2006.01)
*F02C 9/18* (2006.01)
*F04D 27/02* (2006.01)

(52) U.S. Cl.
CPC .............. *F01D 17/141* (2013.01); *F02C 9/18* (2013.01); *F04D 27/0215* (2013.01); *F05D 2220/32* (2013.01); *F05D 2260/56* (2013.01)

(58) Field of Classification Search
CPC .. F01D 17/141; F02C 9/18; F02C 6/08; F04D 27/0215; F05D 2220/32; F05D 2260/56; F05D 2260/50; F05D 2300/501; F05D 2260/96
See application file for complete search history.

(56) References Cited

U.S. PATENT DOCUMENTS

| | | | | |
|---|---|---|---|---|
| 3,094,270 A * | 6/1963 | Kent | .................. | F04D 27/0215 415/140 |
| 3,954,349 A * | 5/1976 | Abild | .................... | F01D 17/162 415/163 |
| 4,050,844 A * | 9/1977 | Miller | .................. | F01D 17/162 415/147 |
| 4,253,797 A * | 3/1981 | Weiler | ................ | F04D 27/0215 415/160 |
| 4,403,912 A * | 9/1983 | Pekari | ................. | F04D 27/0215 415/150 |

(Continued)

FOREIGN PATENT DOCUMENTS

| EP | 0902179 A2 * | 3/1999 | ................ F02C 9/18 |
|---|---|---|---|
| FR | 2793521 A1 * | 11/2000 | .......... F01D 17/162 |
| FR | 2793521 A1 | 11/2000 | |

OTHER PUBLICATIONS

European Search Report for Application No. 20178047.5; dated Oct. 19, 2020.

*Primary Examiner* — J. Todd Newton
(74) *Attorney, Agent, or Firm* — Cantor Colburn LLP (57) ABSTRACT

A damping link assembly for a bleed valve of a gas turbine engine. The damping link assembly having: a bleed valve ring having a link aperture; a mechanical fastener disposed in the link aperture; and a damping guide link operatively coupled to the mechanical fastener at one end for rotation about a first axis of the mechanical fastener and the damping guide link being operatively coupled to an idler bracket at an opposite end for rotation about a second axis, the damping guide link being capable of twisting about a third axis different from the first axis and the second axis when the bleed valve ring is rotated from a first position to a second position.

20 Claims, 4 Drawing Sheets

(56) References Cited

U.S. PATENT DOCUMENTS

| | | | | |
|---|---|---|---|---|
| 4,652,208 A * | 3/1987 | Tameo | F01D 5/146 | 415/148 |
| 4,767,264 A * | 8/1988 | Kisling | F01D 17/162 | 415/156 |
| 4,773,821 A * | 9/1988 | Gonthier | F01D 17/162 | 415/150 |
| 4,826,399 A * | 5/1989 | Perez | F01D 17/162 | 415/148 |
| 4,979,874 A * | 12/1990 | Myers | F01D 7/00 | 415/160 |
| 5,308,226 A * | 5/1994 | Venkatasubbu | F01D 17/162 | 415/160 |
| 5,380,151 A * | 1/1995 | Kostka | F04D 27/0215 | 415/145 |
| 6,086,326 A * | 7/2000 | Honda | F01D 17/00 | 415/126 |
| 6,092,984 A * | 7/2000 | Bouyer | F16F 15/04 | 415/119 |
| 6,106,227 A * | 8/2000 | Honda | F01D 17/00 | 415/126 |
| 6,699,010 B2 * | 3/2004 | Jinnai | F01D 17/16 | 415/164 |
| 6,802,691 B2 * | 10/2004 | Chlus | F01D 17/141 | 415/145 |
| 6,887,035 B2 * | 5/2005 | Bruce | F04D 29/057 | 415/160 |
| 7,004,723 B2 * | 2/2006 | Raulin | F01D 17/162 | 415/160 |
| 7,594,403 B2 * | 9/2009 | Cadieux | F01D 17/105 | 60/782 |
| 8,197,190 B2 * | 6/2012 | Garcin | F01D 17/16 | 415/119 |
| 8,215,902 B2 * | 7/2012 | Major | F04D 29/563 | 415/161 |
| 8,226,357 B2 * | 7/2012 | Bouru | F01D 17/162 | 415/150 |
| 9,103,283 B2 * | 8/2015 | LeBlanc | F02C 9/18 | |
| 9,322,337 B2 * | 4/2016 | Little | F04D 29/522 | |
| 9,328,735 B2 * | 5/2016 | LeBlanc | F04D 29/644 | |
| 9,404,384 B2 * | 8/2016 | Do | F01D 17/162 | |
| 9,506,424 B2 | 11/2016 | Siering | | |
| 9,518,513 B2 | 12/2016 | Pritchard, Jr. et al. | | |
| 9,551,234 B2 * | 1/2017 | Colette | F01D 17/162 | |
| 9,879,611 B2 * | 1/2018 | Morin | F04D 27/0215 | |
| 10,330,021 B2 * | 6/2019 | Benderradji | F01D 17/162 | |
| 10,704,412 B2 * | 7/2020 | Dohse | F16H 21/44 | |
| 2005/0008489 A1 * | 1/2005 | Perruchaut | F04D 29/023 | 416/160 |
| 2007/0137175 A1 * | 6/2007 | Moniz | F04D 27/023 | 60/226.1 |
| 2009/0074569 A1 * | 3/2009 | Garcin | F04D 29/563 | 415/148 |
| 2013/0340441 A1 * | 12/2013 | Little | F04D 27/0215 | 60/785 |
| 2013/0340555 A1 * | 12/2013 | LeBlanc | F01D 17/162 | 74/469 |
| 2013/0343876 A1 * | 12/2013 | LeBlanc | F01D 17/141 | 415/119 |
| 2014/0083208 A1 * | 3/2014 | Little | F04D 29/563 | 73/862.338 |
| 2015/0027130 A1 * | 1/2015 | LeBlanc | F01D 17/141 | 60/785 |
| 2018/0223741 A1 * | 8/2018 | Little | F01D 17/141 | |
| 2020/0386115 A1 * | 12/2020 | Little | F04D 27/0215 | |

* cited by examiner

GAS TURBINE ENGINE BLEED VALVE DAMPING GUIDE LINK

BACKGROUND

Exemplary embodiments pertain to the art of gas turbine engines and, more particularly, to a bleed valve guiding assembly for such engines.

During start-up of a gas turbine engine, the low pressure turbine is not providing power to turn the low pressure compressor. Therefore, the low pressure compressor includes a bleed valve to vent the air from the low pressure compressor so that rotating the low pressure compressor is easier. In addition, during acceleration and deceleration, the output of the low pressure compressor may need to be vented in order to maintain pressure balance between the low and high pressure compressors to prevent stalling thereof. These are only two examples of why a bleed valve may be placed in the low pressure compressor.

Bleed systems are challenged to be durable, lightweight and low cost. Prior bleed valve systems require a series of rigid links that guide the valve in an arc as it moves. The rigid link is connected to the valve with a spherical bearing and slides on a pin to facilitate the different plane of motion that the link and the valve move in. The rigidity of the components requires a number of components, leading to a more complex assembly that may be more prone to durability issues.

BRIEF DESCRIPTION

Disclosed is a damping link assembly for a bleed valve of a gas turbine engine. damping link assembly for a bleed valve of a gas turbine engine. The damping link assembly having: a bleed valve ring having a link aperture; a mechanical fastener disposed in the link aperture; and a damping guide link operatively coupled to the mechanical fastener at one end for rotation about a first axis of the mechanical fastener and the damping guide link being operatively coupled to an idler bracket at an opposite end for rotation about a second axis, the damping guide link being capable of twisting about a third axis different from the first axis and the second axis when the bleed valve ring is rotated from a first position to a second position.

In addition to one or more of the features described above, or as an alternative to any of the foregoing embodiments, the damping guide link is formed from one of steel, nickel, titanium or aluminum.

In addition to one or more of the features described above, or as an alternative to any of the foregoing embodiments, the bleed valve ring is operatively connected to a compressor casing.

In addition to one or more of the features described above, or as an alternative to any of the foregoing embodiments, the compressor casing is a low pressure compressor casing.

In addition to one or more of the features described above, or as an alternative to any of the foregoing embodiments, the mechanical fastener is a pin.

In addition to one or more of the features described above, or as an alternative to any of the foregoing embodiments, the damping guide link is coupled to an outer surface of the bleed valve ring.

In addition to one or more of the features described above, or as an alternative to any of the foregoing embodiments, an end of the damping guide link is disposed within a hollow portion of the bleed valve ring.

In addition to one or more of the features described above, or as an alternative to any of the foregoing embodiments, the damping guide link and the bleed valve ring rotate about different axes.

In addition to one or more of the features described above, or as an alternative to any of the foregoing embodiments, the damping guide link has a rectangular portion capable of rotating about the third axis.

Also disclosed is a gas turbine engine. The gas turbine engine having: a compressor section; a combustor section; a turbine section; and a damping link assembly for bleed valve of the compressor section, the damping link assembly including: a bleed valve ring having a link aperture, the bleed valve ring operatively coupled to a casing of the compressor section; a mechanical fastener disposed in the link aperture; and a damping guide link operatively coupled to the mechanical fastener at one end for rotation about a first axis of the mechanical fastener and the damping guide link being operatively coupled to an idler bracket at an opposite end for rotation about a second axis, the damping guide link being capable of twisting about a third axis different from the first axis and the second axis when the bleed valve ring is rotated from a first position to a second position.

In addition to one or more of the features described above, or as an alternative to any of the foregoing embodiments, the damping guide link is formed from one of steel, nickel, titanium or aluminum.

In addition to one or more of the features described above, or as an alternative to any of the foregoing embodiments, the casing is a low pressure compressor casing.

In addition to one or more of the features described above, or as an alternative to any of the foregoing embodiments, the mechanical fastener is a pin.

In addition to one or more of the features described above, or as an alternative to any of the foregoing embodiments, the damping guide link is coupled to an outer surface of the bleed valve ring.

In addition to one or more of the features described above, or as an alternative to any of the foregoing embodiments, an end of the damping guide link is disposed within a hollow portion of the bleed valve ring.

In addition to one or more of the features described above, or as an alternative to any of the foregoing embodiments, the damping guide link and the bleed valve ring rotate about different axes.

In addition to one or more of the features described above, or as an alternative to any of the foregoing embodiments, the damping guide link has a rectangular portion capable of rotating about the third axis.

Also disclosed is a method of damping a bleed valve ring of a bleed valve of a gas turbine engine as the bleed valve ring moves from a first position to a second position. The method including the steps of: coupling the bleed valve ring of the bleed valve to an idler bracket of the bleed valve with a damping guide link, wherein the damping guide link is operatively coupled to the bleed valve ring at one end for rotation about a first axis and the damping guide link being operatively coupled to the idler bracket at an opposite end for rotation about a second axis; and twisting the damping guide link being about a third axis different from the first axis and the second axis when the bleed valve ring is rotated from the first position to the second position.

In addition to one or more of the features described above, or as an alternative to any of the foregoing embodiments, the bleed valve ring is operatively connected to a compressor casing.

In addition to one or more of the features described above, or as an alternative to any of the foregoing embodiments, the compressor casing is a low pressure compressor casing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
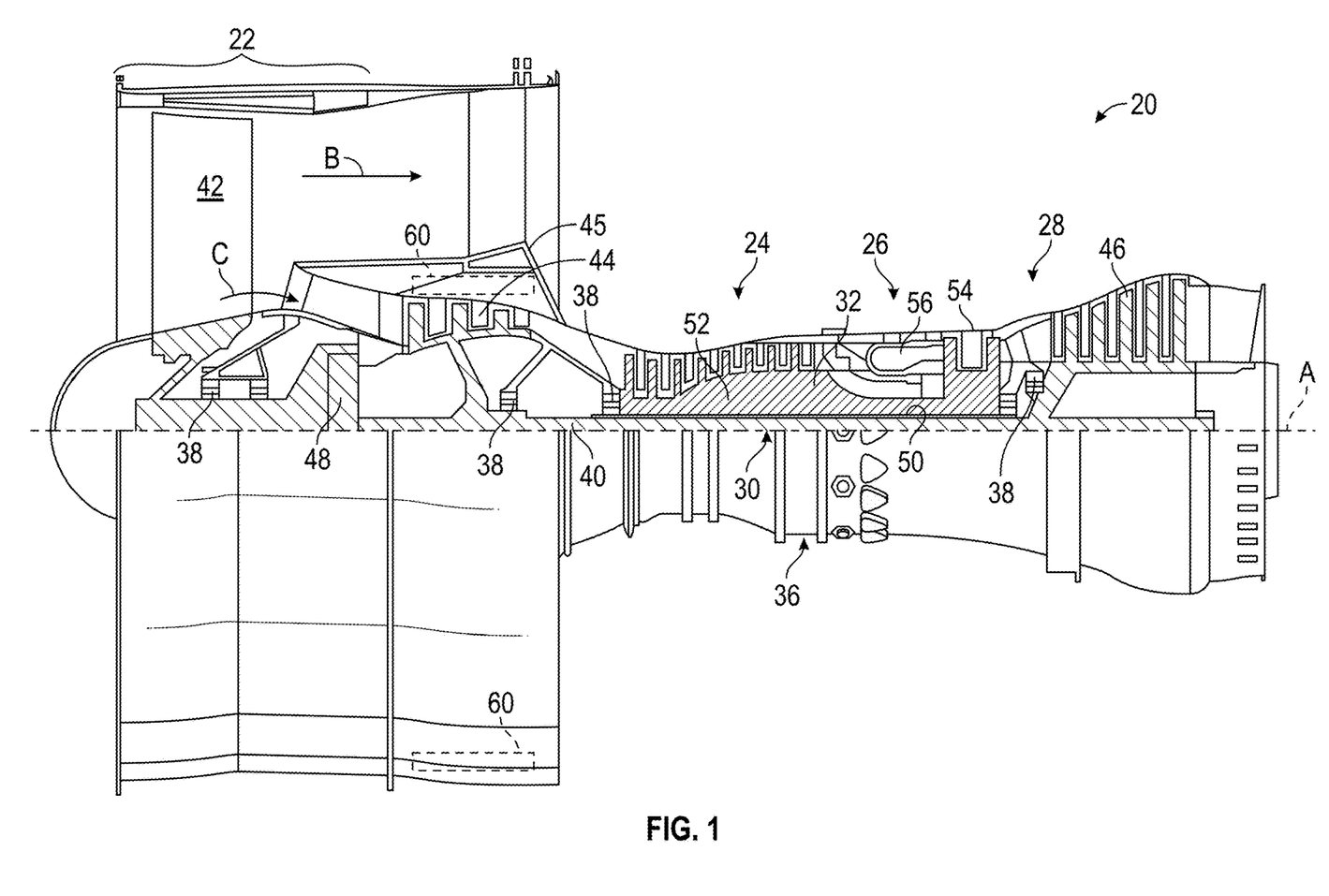
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
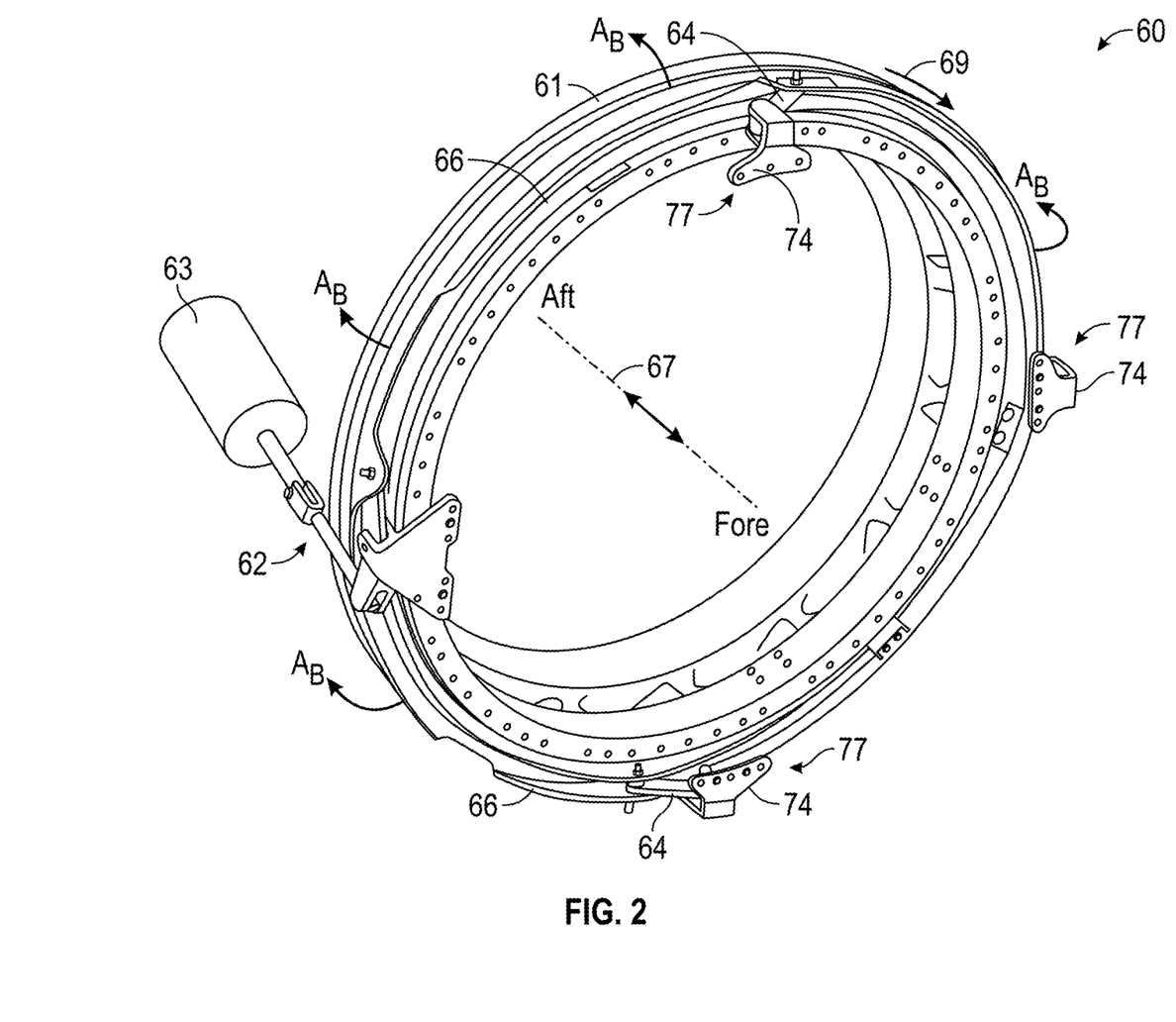
FIG. 2 is a perspective view of a bleed valve guiding assembly.

FIG. 2 illustrates a perspective view of a bleed valve 60, which in one embodiment may be attached to a compressor case and annularly surrounds a portion of the compressor section 24. In some embodiments, the bleed valve 60 is attached to a case 45 of the low pressure compressor 44, but other portions of the overall compressor section 24 are contemplated as benefitting from the embodiments disclosed herein. In one embodiment, the bleed valve 60 is connected to the low pressure compressor case 45 (shown in FIG. 1) on the fore and aft sides of the bleed valve 60.

Bleed valve 60 includes a bleed valve case 61, a bleed valve actuation assembly 62 (with actuator 63), a plurality of bleed valve idler assemblies 77 (which each have a damping arrangement via a damping guide link 64 and a bleed valve ring 66. In the illustrated embodiment, the bleed valve actuation assembly 62 is attached to bleed valve case 61, although the connection between bleed valve actuation assembly 62 and low pressure compressor case 45 is not shown and neither are the connections between low pressure case 45 and bleed valve idler assemblies 77. This is because the low pressure case 45 has been removed for greater visibility of bleed valve 60 in FIG. 2.

As mentioned above, it is advantageous to open the bleed valve 60 at particular times. In the illustrated embodiment, this occurs by the bleed valve actuator assembly 62 (specifically actuator 63), forcing the bleed valve ring 66 forward with assistance from one or more damping guide links 64. As mentioned above the bleed valve actuation assembly 62 is attached to a bleed valve case 61. When the bleed valve 60 is open, some of the core airflow flows through the bleed valve 60 which is shown as bleed air $A_B$. This bleed air $A_B$ joins secondary air and is expelled from the gas turbine engine 10.

In the illustrated embodiment, the bleed valve 60 is shown in the closed position. Around the aft-most edge of the bleed valve ring 66 is a bulb seal (not shown) that interfaces with a seal seat on a radially extending flange (not shown) of bleed valve case 61. In this position, the bleed valve ring 66 prevents bleed air $A_B$ from escaping out of the compressor section 24 or low pressure compressor 44.

As stated previously, the bleed valve actuation assembly 62 exerts forward force on the bleed valve ring 66 in order to open the bleed valve 60. As the bleed valve ring 66 moves forward along a bleed valve axis 67, the bleed valve ring 66 is guided by the damping guide links 64. Due to the multiple linkage arrangement of bleed valve 60, the bleed valve ring 66 rotates slightly (as indicated by circumferential arrow 69) as the bleed valve ring 66 moves forward. As stated previously when the bleed valve 60 is open, bleed air $A_B$ escapes from the compressor section 24 substantially around the entire circumference of the bleed valve 60.

While the bleed valve ring 66 is constrained in place by being held against the bleed valve case 61 when in the closed position, once the bleed valve 60 is opened, the bleed valve ring 66 is substantially less stabilized by bleed valve case 61. Therefore, bleed valve ring 66 is subject to vibrations that propagate throughout gas turbine engine 10. In addition, buffeting from escaping bleed air $A_B$ can cause the bleed valve ring 66 to vibrate. The damping guide links 64 constrain movement of bleed valve ring 66 when the bleed valve 60 is in the open position. The damping guide links 64 disclosed herein allow for the bleed valve 60 to bleed air out of the compressor section 24 while preventing the bleed valve ring 66 from damaging itself or other nearby components.

Figure 3:
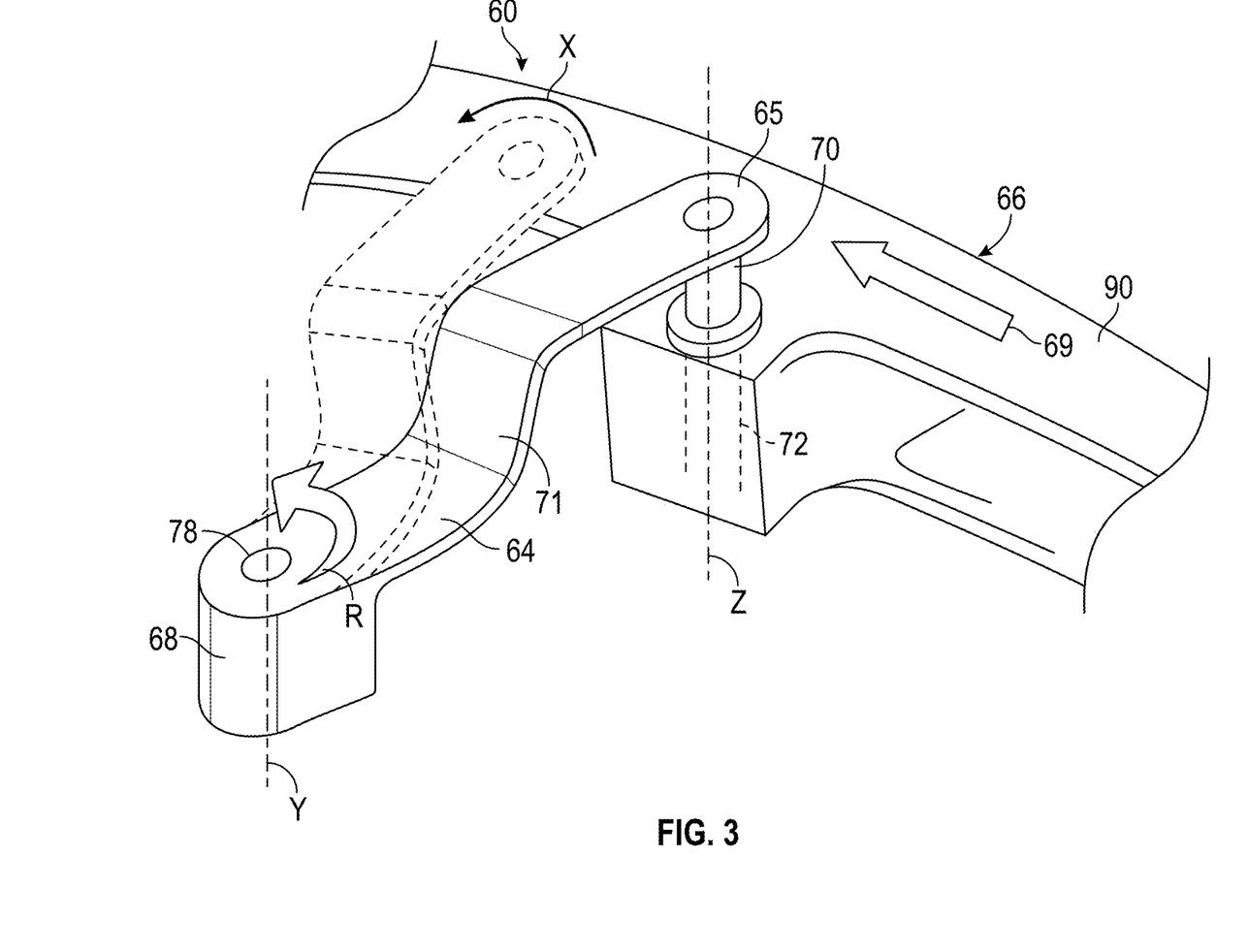
FIG. 3 is a perspective view of the bleed valve damping guide link according to one aspect of the disclosure.

In FIG. 3, a perspective view of one of the damping guide links 64, which operatively couples the bleed valve ring 66 of the bleed valve 60 to an idler bracket 74 (FIG. 2). Although only one damping guide link 64 is illustrated in FIG. 3 it is understood that a plurality of damping guide links 64 may be used to provide the desired movement and damping of bleed valve ring 66. The damping guide link 64 is rotatably attached to bleed valve ring 66 proximate a first end 65 of the damping guide link 64 with a pin 70 which runs through an aperture 72 of the bleed valve ring 66. This connection is the only connection needed for damping, as will be appreciated from the disclosure herein. In particular, other damping components, such as rollers or spherical bearings are not necessary. Thus, the damping guide link 64 is only secured to the bleed valve ring 66 by a single component (e.g., pin 70). The damping guide link 64 is also rotatably attached proximate a second end 68 of the damping guide link 64 to the idler bracket 74 (FIG. 2) by a mechanical fastener (not shown) which runs through aperture 78 of the idler bracket 74.

In order to provide the desired damping of the bleed valve ring 66, the damping guide link 64 is designed to be flexible about its axis of twisting (see arrow X in FIG. 3) and stiff about its axis of rotation (see arrow R in FIG. 3). As used herein, twisting of the damping guide link 64 in the direction of arrow X is intended to refer to elastic twisting of the damping guide link 64 through movement of the bleed valve ring 66 from a closed bleed valve position to an open bleed valve position via operation of the bleed valve actuation assembly 62. Moreover, this elastic twisting of the damping guide link 64 provides a bias or preload to the damping guide link 64 that creates a damping effect to the bleed valve ring 66, which allows for the removal of any additional components such as a bearing, rubber damper roller or similar parts that would be required for damping of the bleed valve ring 66 when it is in a position corresponding to an open bleed valve. As used herein, elastic twisting is intended to refer to a twisting of the damping guide link 64 such that when the bleed valve ring 66 moves from an open bleed valve position to a closed bleed valve position via operation of the bleed valve actuation assembly 62 the damping guide link 64 will return to its untwisted position (e.g., bleed valve 60 in a closed position). In other words, elastic twisting of the damping guide link 64 will allow for the damping guide link 64 to return to its untwisted position corresponding to the closed bleed valve 60. As such, the twisting of the damping guide link 64 in the direction of arrow X will not be to the point where the damping guide link 64 has yielded or been plastically deformed such that it cannot return to its untwisted position corresponding to the closed bleed valve 60. As used herein, flexible about the axis of twisting (X) concerns a portion of the damping guide link 64 that is more flexible than a portion of the damping guide link 64 proximate to the axis Y and/or Z. In one embodiment, this is provided by a thin rectangular section 71 that eliminates the need for any additional components such as a bearing, for example.

In one embodiment, the damping guide link 64 may be formed from steel, nickel, titanium or aluminum in order to provide the desired damping of the bleed valve ring 66 by the damping guide link 64 as it twists in the direction of arrow X. The preceding materials are merely illustrative and not intended to be limiting. As shown with arrow X, the damping guide link 64 or portion 71 twists during rotation of the bleed valve ring 66 due to its rotation about an axis Y that is different than the rotational axis Z of the bleed valve ring 66. As noted above, the requirement for a spherical bearing is eliminated because the damping guide link 64 accommodates the motions of the bleed valve ring 66. In addition, the damping guide link 64 inherently provides damping to the overall system due to a preload from the twisting of the link 64 in the direction of arrow X, thereby eliminating the need for a rubber damper roller or a similar part. Such removal, reduces part count and cost, while also enhancing the durability of the system.

Figure 4:
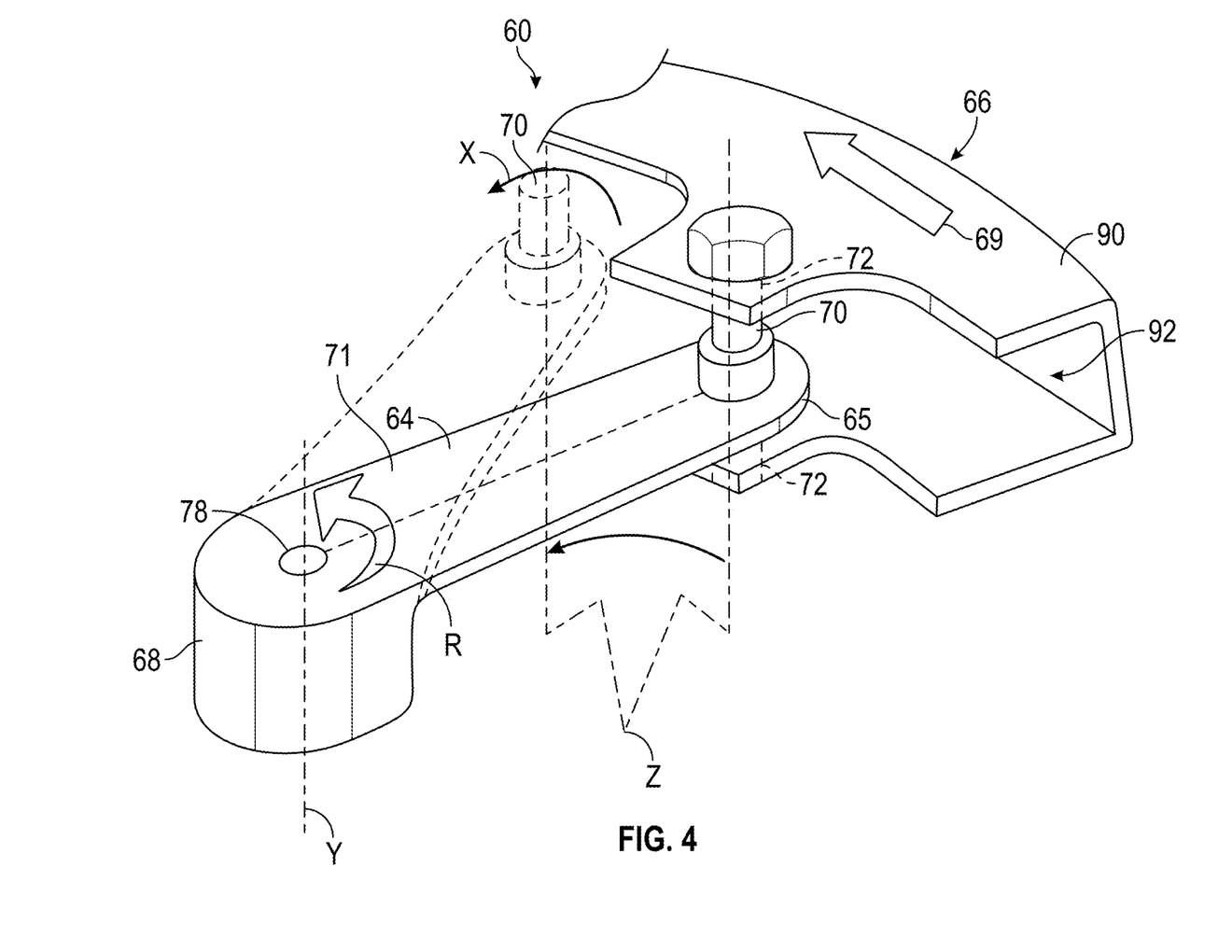
FIG. 4 is a perspective view of the bleed valve damping guide link according to another aspect of the disclosure.

As described above, the damping guide link 64 is coupled proximate the first end 65 to the bleed valve ring 66. In the embodiment illustrated in FIG. 3, the damping guide link 64 is attached to an outer surface 90 of the bleed valve ring 66. However, as shown in FIG. 4, the damping guide link 64 may be positioned to be within a hollow portion 92 (e.g., middle) of the bleed valve ring 66. Again and although only one damping guide link 64 is illustrated in FIG. 4 it is understood that a plurality of damping guide links 64 may be used to provide the desired movement and damping of bleed valve ring 66.

In one embodiment, the flexible portion 71 of the damping guide link 64 is angularly oriented with respect to the portions of the damping guide link 64 proximate to ends 65 and 68 such that the portions of the damping guide link 64 proximate to ends 65 and 68 are offset from each other or radially spaced from each other. For example, the portions of the damping guide link 64 proximate to ends 65 and 68 may be in two different parallel planes (prior to twisting in the direction of arrow X) and are connected by the flexible portion 71 of the damping guide link 64 (FIG. 3). In another embodiment, the flexible portion 71 of the damping guide link 64 is coplanar with respect to the portions of the damping guide link 64 proximate to ends 65 and 68 such that the portions of the damping guide link 64 proximate to ends 65 and 68 are aligned each other prior to the twisting in the direction of arrow X. See for example, FIG. 4.

Accordingly and in one embodiment, a damping link assembly for a bleed valve 60 of a gas turbine engine 20 is provided. The damping link assembly including: a bleed valve ring 66 having a link aperture 72; a mechanical fastener 70 disposed in the link aperture 72; and a damping guide link 64 operatively coupled to the mechanical fastener 70. The damping guide link 64 being operatively coupled to the mechanical fastener at one end for rotation about a first axis of the mechanical fastener and the damping guide link 64 being operatively coupled to an idler bracket 74 at an opposite end for rotation about a second axis, the damping guide link 64 being capable of twisting about a third axis different from the first axis and the second axis when the bleed valve ring is rotated from a first position to a second position. This twisting creates a damping effect to the bleed valve ring 66 as well as provides a preload or bias to the damping guide link 64 due to the twisting in the direction of arrow X. This preload or bias will also assist in returning the damping guide link 64 to its original configuration (e.g., before twisting in the directions of arrow X) due to the applied force of the actuator assembly 62 in the opening direction such that the damping guide link 64 will return to its untwisted configuration (FIGS. 3 and 4) once the applied force of the actuator assembly 62 in the opening direction is reversed into a closing force in order to close the bleed valve 60.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A damping link assembly for a bleed valve of a gas turbine engine comprising:
   a bleed valve ring having a link aperture;
   a mechanical fastener disposed in the link aperture; and
   a damping guide link operatively coupled to the mechanical fastener at one end for rotation about a first axis of the mechanical fastener and the damping guide link being operatively coupled to an idler bracket at an opposite end for rotation about a second axis extending through an aperture at the opposite end of the damping guide link, the damping guide link being capable of elastic twisting in a direction about a third axis different from the first axis and the second axis when the bleed valve ring is rotated from a first position corresponding to a closed bleed valve position to a second position corresponding to an open bleed valve position, wherein a portion of the damping guide link is more flexible about the third axis than a portion of the damping guide link proximate the first axis and/or the second axis, the elastic twisting in the direction provides a preload or bias to the damping guide link which assists in returning the damping guide link to an untwisted configuration corresponding to the closed bleed valve position.

2. The damping link assembly of claim 1, wherein the damping guide link is formed from one of steel, nickel, titanium or aluminum.

3. The damping link assembly of claim 1, wherein the bleed valve ring is operatively connected to a compressor casing.

4. The damping link assembly of claim 3, wherein the compressor casing is a low pressure compressor casing.

5. The damping link assembly of claim 1, wherein the mechanical fastener is a pin.

6. The damping link assembly of claim 1, wherein the damping guide link is coupled to an outer surface of the bleed valve ring.

7. The damping link assembly of claim 1, wherein an end of the damping guide link is disposed within a hollow portion of the bleed valve ring.

8. The damping link assembly of claim 1, wherein the damping guide link and the bleed valve ring rotate about different axes.

9. The damping link assembly of claim 1, wherein the damping guide link further comprises a flexible portion that is capable of elastically twisting about the third axis and the flexible portion is angularly oriented with respect to portions of the damping guide link proximate to the one end and the opposite end such that the portions of the damping guide link proximate to the one end and the opposite end are offset from each other or radially spaced from each other.

10. A gas turbine engine comprising:
    a compressor section;
    a combustor section;
    a turbine section; and
    a damping link assembly for a bleed valve of the compressor section, the damping link assembly comprising:

a bleed valve ring having a link aperture, the bleed valve ring operatively coupled to a casing of the compressor section;
a mechanical fastener disposed in the link aperture; and
a damping guide link operatively coupled to the mechanical fastener at one end for rotation about a first axis of the mechanical fastener and the damping guide link being operatively coupled to an idler bracket at an opposite end for rotation about a second axis extending through an aperture at the opposite end of the damping guide link, the damping guide link being capable of elastic twisting in a direction about a third axis different from the first axis and the second axis when the bleed valve ring is rotated from a first position corresponding to a closed bleed valve position to a second position corresponding to an open bleed valve position, wherein a portion of the damping guide link is more flexible about the third axis than a portion of the damping guide link proximate the first axis and/or the second axis, the elastic twisting in the direction provides a preload or bias to the damping guide link which assists in returning the damping guide link to an untwisted configuration corresponding to the closed bleed valve position.

11. The gas turbine engine of claim 10, wherein the damping guide link is formed from one of steel, nickel, titanium or aluminum.

12. The gas turbine engine of claim 10, wherein the casing is a low pressure compressor casing.

13. The gas turbine engine of claim 10, wherein the mechanical fastener is a pin.

14. The gas turbine engine of claim 10, wherein the damping guide link is coupled to an outer surface of the bleed valve ring.

15. The gas turbine engine of claim 10, wherein an end of the damping guide link is disposed within a hollow portion of the bleed valve ring.

16. The gas turbine engine of claim 10, wherein the damping guide link and the bleed valve ring rotate about different axes.

17. The gas turbine engine of claim 10, wherein the wherein the damping guide link further comprises a flexible portion that is capable of elastically twisting about the third axis and the flexible portion is angularly oriented with respect to portions of the damping guide link proximate to the one end and the opposite end such that the portions of the damping guide link proximate to the one end and the opposite end are offset from each other or radially spaced from each other.

18. A method of damping a bleed valve ring of a bleed valve of a gas turbine engine as the bleed valve ring moves from a first position corresponding to a closed bleed valve position to a second position corresponding to an open bleed valve position, comprising:
coupling the bleed valve ring of the bleed valve to an idler bracket of the bleed valve with a damping guide link, wherein the damping guide link is operatively coupled to the bleed valve ring at one end for rotation about a first axis and the damping guide link being operatively coupled to the idler bracket at an opposite end for rotation about a second axis extending through an aperture at the opposite end of the damping guide link; and
elastically twisting the damping guide link in a direction about a third axis in order provide a preload or bias to the damping guide link when the bleed valve ring is rotated from the first position to the second position, the third axis being different from the first axis and the second axis and wherein a portion of the damping guide link is more flexible about the third axis than a portion of the damping guide link proximate the first axis and/or the second axis, the preload or bias provided to the damping guide link assists in returning the damping guide link to an untwisted configuration corresponding to the closed bleed valve position.

19. The method of claim 18, wherein the bleed valve ring is operatively connected to a compressor casing.

20. The method of claim 19, wherein the compressor casing is a low pressure compressor casing.

* * * * *